United States Patent
Vialen et al.

(10) Patent No.: US 6,917,807 B1
(45) Date of Patent: Jul. 12, 2005

(54) CELL SELECTION METHOD

(75) Inventors: Jukka Vialen, Espoo (FI); Fabio Longoni, Espoo (FI); Zhi-Chun Honkasalo, Kauniainen (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/914,307

(22) PCT Filed: Mar. 10, 2000

(86) PCT No.: PCT/FI00/00187

§ 371 (c)(1),
(2), (4) Date: Nov. 21, 2001

(87) PCT Pub. No.: WO00/54522

PCT Pub. Date: Sep. 14, 2000

(30) Foreign Application Priority Data

Mar. 10, 1999 (FI) .................................................. 990526

(51) Int. Cl.⁷ ............................. H04Q 7/20; H04Q 7/00
(52) U.S. Cl. ............................... 455/435.2; 455/435.1; 455/438; 455/450; 370/329
(58) Field of Search ............................... 455/404.2, 420, 455/422.1, 424–425, 433–434, 435.1, 435.2, 436–440, 450, 455, 464, 432.1, 414.2; 370/329, 341

(56) References Cited

U.S. PATENT DOCUMENTS

| | | | | |
|---|---|---|---|---|
| 5,797,096 A | * | 8/1998 | Lupien et al. | 455/433 |
| 5,854,981 A | * | 12/1998 | Wallstedt et al. | 455/439 |
| 6,181,682 B1 | * | 1/2001 | Abbadessa et al. | 370/328 |
| 6,216,004 B1 | * | 4/2001 | Tiedemann et al. | 455/442 |
| 6,674,739 B1 | * | 1/2004 | Lee et al. | 370/342 |
| 6,714,524 B1 | * | 3/2004 | Kim et al. | 370/335 |
| 6,714,784 B1 | * | 3/2004 | Forssell et al. | 455/436 |
| 6,829,482 B2 | * | 12/2004 | Rune et al. | 455/442 |

FOREIGN PATENT DOCUMENTS

| | | | | |
|---|---|---|---|---|
| EP | 0 594 354 A3 | 4/1994 | | H04B/7/26 |
| EP | 0639 036 A2 | 2/1995 | | H04Q/7/38 |
| EP | 0 785 696 A2 | 7/1997 | | H04Q/7/24 |
| FI | 103466 | 8/1998 | | H04Q/7/26 |
| WO | WO 95/10922 | 4/1995 | | H04Q/7/38 |
| WO | WO 96/02118 | 1/1996 | | H04Q/7/38 |
| WO | WO 97/16936 | 5/1997 | | H04Q/7/24 |

* cited by examiner

*Primary Examiner*—William Trost
*Assistant Examiner*—Meless Zewdu
(74) *Attorney, Agent, or Firm*—Cohen,Pontani, Lieberman & Pavane

(57) ABSTRACT

The invention is directed to a method for cell selection in a cellular telecommunication system. According to the invention, cell identification information is attached as a parameter to an RRC message initiating the state change of the mobile station to the cell-connected state. Advantageously, the network selects a cell to be suggested as the cell for use by the mobile station in the cell-connected state, and the network indicates said cell by attaching cell identification as a parameter to said RRC message. Consequently, the mobile station may make the final selection of the cell, and indicate the selected cell to the network by attaching cell identification information as a parameter to a second RRC message, such as the response message to the RRC message initiating the state change.

21 Claims, 2 Drawing Sheets

CELL SELECTION METHOD

CROSS REFERENCES TO RELATED APPLICATIONS

This is a U.S. national stage application under 35 U.S.C. §371 of international stage application No. PCT/FI00/00187, filed on Mar. 10, 2000. Priority is claimed under 35 U.S.C. §119(a) and 35 U.S.C. §365(b) from Finnish Patent Application No. 990526, which was filed on Mar. 10, 1999, and from which priority was properly claimed in the aforementioned international stage application.

The invention is directed to a method for cell selection in a cellular telecommunication system.

BACKGROUND OF THE INVENTION

Some of the abbreviations used in this application are as follows:
CCCH Common Control Channel
DCCH Dedicated Control Channel
DRNC Drift Radio Network Controller
DTCH Dedicated Traffic Channel
FACH Forward Link Access Channel
IMSI International Mobile Subscriber Identity
PCCH Paging Control Channel
PCH Paging Channel
PLMN Public Land Mobile Network
P-TMSI Packet Temporary Mobile Subscriber Identity
PSCH Random Access Channel
RNC Radio Network Controller
RNTI Radio Network Temporary Identity
RRC Radio Resource Control
TMSI Temporary Mobile Subscriber Identity
UE User Equipment
UMTS Universal Mobile Telecommunication System
UTRAN UMTS Terrestrial Radio Access Network For clarification of common terms used in this document, an overview of certain cellular telecommunication system configurations is presented in the following.

Proposals for third-generation systems include UMTS (Universal Mobile Telecommunications System) and FPLMTS/IMT-2000 (Future Public Land Mobile Telecommunications System/International Mobile Telecommunications at 2000 MHz). In these plans cells are categorised according to their size and characteristics into pico-, nano-, micro- and macrocells, and an example of the service level is the bit rate. The bit rate is the highest in picocells and the lowest in macrocells. The cells may overlap partially or completely and there may be different terminals so that not all terminals necessarily are able to utilise all the service levels offered by the cells.

FIG. 1 shows an exemplary block diagram of a possible structure of a third generation cellular network. Such networks typically comprise a core network 50 connected to one or more radio access networks 40 (RAN). Such radio access networks are often referred to as UTRAN networks (UMTS Terrestrial Radio Access Network). The radio access networks typically comprise at least a plurality of base stations 20a,20b, 20c (BS) for realizing the radio connections to mobile stations 10a,10b, and at least one radio network controller 30 (RNC) for controlling the base stations. The radio network controllers are connected to a mobile switching center (MSC) 60 in the core network.

A third generation UE can be in many different states in relation to the network. If no connections are present, the UE is in the idle mode. When at least one signalling connection exists, the UE is in connected mode. The connected mode has two main states: a URA connected state and a cell connected state. In the URA connected state, the position of the UE is known on URA (UMTS Registration Area) level. A URA consists of a plurality of cells within a certain geographical area. In the cell connected state, the position of the UE is known in the cell level. All data transmission is effected in the cell connected state.

From the viewpoint of radio resource allocation, a UE in connected mode i.e. when RRC connections exist has two main states: dedicated channel state (DCH) and common channel state (CCH).

In dedicated channel state the UE uses dedicated radio interface resources for the connection with UTRAN. There is one dedicated radio link for each cell included in the Active Set, i.e. the set of cells used by the UE. The Active Set may contain one or more cells.

In common channel state the UE shares a common channel with other users. The common channel state the UE may be in RACH/FACH or RACH/PCH substates. In RACH/FACH state the position of the UE is known at cell level, i.e. the UE is always connected to one cell. In RACH/PCH state the position of the UE is known either at cell level or at URA level. DCH to CCH state transition may occur for example as a result of the following RRC procedures:

Transport channel reconfiguration, in which a transport channel is changed from a dedicated to a common channel, for example for a NRT bearer.

Radio access bearer (RAB) release, in which at least one bearer is released, and the last remaining one is a non-real time (NRT) bearer which is currently not active or is which is configured to use common channels.

Physical channel reconfiguration, which procedure may assign, replace or release a set of physical channels used by an UE. A physical channel reconfiguration procedure may also change the used transport channel type and RRC state.

Radio access bearer (RAB) reconfiguration, in which parameters for a radio access bearer or a signalling link are reconfigured to reflect a change in required QoS level. A RAB reconfiguration procedure may comprise for example changing of RLC parameter, changing of multiplexing priority for DTCH/DCCH, changing of DCH scheduling priority, changing of TFS for DCH, change of TFCS, assigning or releasing of physical channel(s) and changing of used transport channel types.

The signalling in the case of the four previous procedures is similar: they are started by the serving RNC which sends a XXX message to the UE, which replies with a XXX Complete message, in which XXX refers to the particular procedure in question.

In the transition from DCH to CCH—cell connected state, the cell that will be initially used in the CCH state needs to be selected and indicated. A known way of selecting and indicating the initial cell is the use of a cell update procedure started by the UE. In this method the UE selects the cell, and sends a cell update message using the RACH channel of the selected cell. The network replies by sending a cell update confirm message via the corresponding FACH channel. This solution causes too much signalling on the RACH/FACH channels. Further, the UE may not know all details which affect the optimality of the cell selection. For example, the network may for various reasons prefer that the UE selects a macro cell, or a cell that is controlled by the SRNC.

Another known solution is that the XXX complete message is sent by the UE on the RACH channel of the selected cell after the DCH is released. In this case the XXX Complete message should be acknowledged by the network to ensure that the message has gone through, which results in a similar signalling load as the cell update method.

SUMMARY OF THE INVENTION

An object of the invention is to realize a method, which reduces the amount of signalling associated with DCH to CCH state change. A further object of the invention is to realize a method, which allows reduction of the time needed for a DCH to CCH state change.

The objects are reached by arranging the network to suggest a cell to be used by the UE in the CCH state, and by indicating the cell as a parameter to the RRC command, which initiates the DCH to CCH state change.

The method according to the invention is characterized by that, which is specified in the characterizing part of the independent method claim. The dependent claims describe further advantageous embodiments of the invention.

According to the invention, cell identification information is attached as a parameter to a RRC message initiating the state change of the mobile station to the cell-connected state. Advantageously, the network selects a cell to be suggested as the cell for use by the mobile station in the cell-connected state, and the network indicates said cell by attaching cell identification information as a parameter to said RRC message. Consequently, the mobile station may make the final selection of the cell, and indicate the selected cell to the network by attaching cell identification information as a parameter to a second RRC message, such as the response message to the RRC message initiating the state change.

BRIEF DESCRIPTION OF THE DRAWINGS

The invention is described in more detail in the following with reference to the accompanying drawings, of which

Same reference numerals are used for similar entities in the figures.

DETAILED DESCRIPTION

Figure 1:
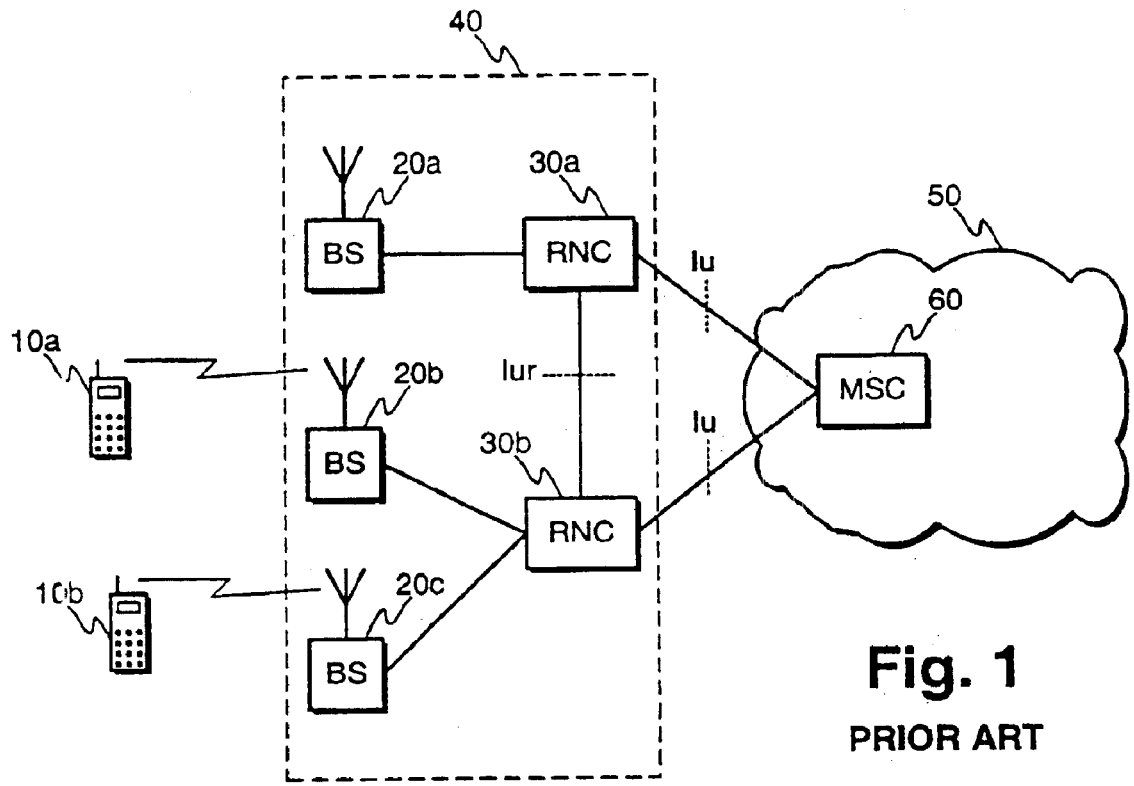
FIG. 1 illustrates a network structure according to prior art.
Figure 2:
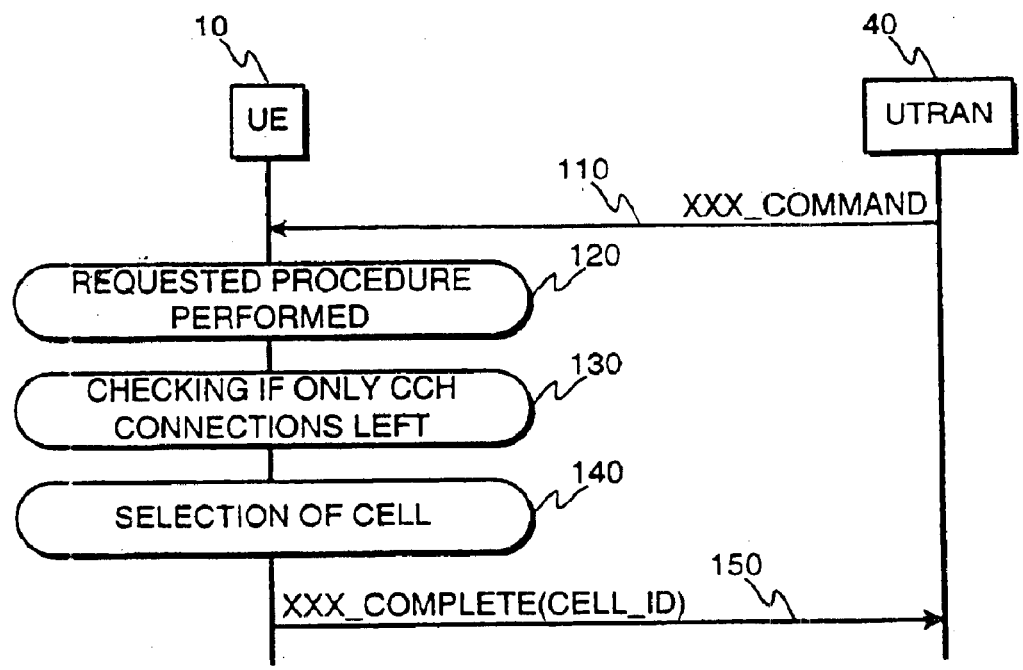
FIG. 2 illustrates signalling according to an advantageous embodiment of the invention.

FIG. 2 illustrates signalling according to an advantageous embodiment of the invention. FIG. 2 shows a UE 10 and UTRAN 40, and illustrates signalling between them. In the first step 110, UTRAN sends a command XXX_COMMAND to initiate a RRC procedure, in which XXX refers to the particular procedure in question. After receiving the command, the UE performs 120 any necessary actions according to the requested procedure. In this embodiment, UE next checks 130, if only CCH connections are left. In this example, only CCH connections are found to be left after the completed RRC procedure. Consequently, the UE selects 140 a cell to be indicated as the location cell of the UE in the CCH cell connected state, and sends 150 a XXX_COMPLETE message back to UTRAN to indicate that the requested RRC procedure is complete, attaching cell identification information CELL_ID as a parameter to the XXX_COMPLETE message. Preferably, the UE sends the XXX_COMPLETE message on the DCH channel before releasing the DCH channel.

The RRC procedure referred to in the previous paragraph and in the rest of this specification with the XXX_COMMAND and XXX_COMPLETE messages may be any RRC procedure, which may result in a transition of the UE from DCH to CCH state. Examples of procedures are transport channel reconfiguration, radio access bearer (RAB) release, physical channel reconfiguration, and radio access bearer (RAB) reconfiguration, which were described in the previous description of prior art.

Figure 3:
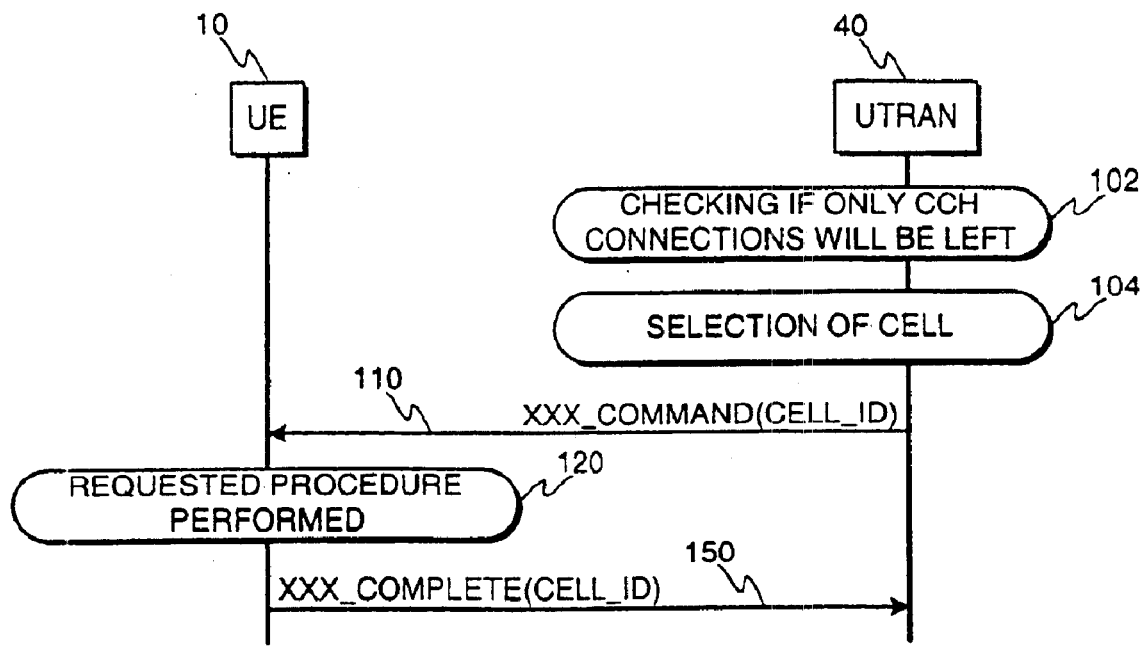
FIG. 3 illustrates signalling according to an advantageous embodiment of the invention.

FIG. 3 illustrates signalling according to a further advantageous embodiment of the invention. In this embodiment, the network selects the cell used in the CCH state. Before initiating the necessary RRC procedure, the network checks 102 if only CCH connections will be left after the procedure. If that is the case, as it is in this example, the network selects 104 the cell to be indicated as the location of the UE in the CCH state. Next, the network initiates the desired RRC procedure by sending 110 a XXX_COMMAND to the UE, attaching identification information of the selected cell CELL_ID as a parameter to the XXX_COMMAND message. After receiving the XXX_COMMAND message, the UE performs 120 the requested RRC procedure, and replies by sending 150 a XXX_COMPLETE message back to the network. The UE may send the CELL_ID information as a parameter of the XXX_COMPLETE message back to the network.

Figure 4:
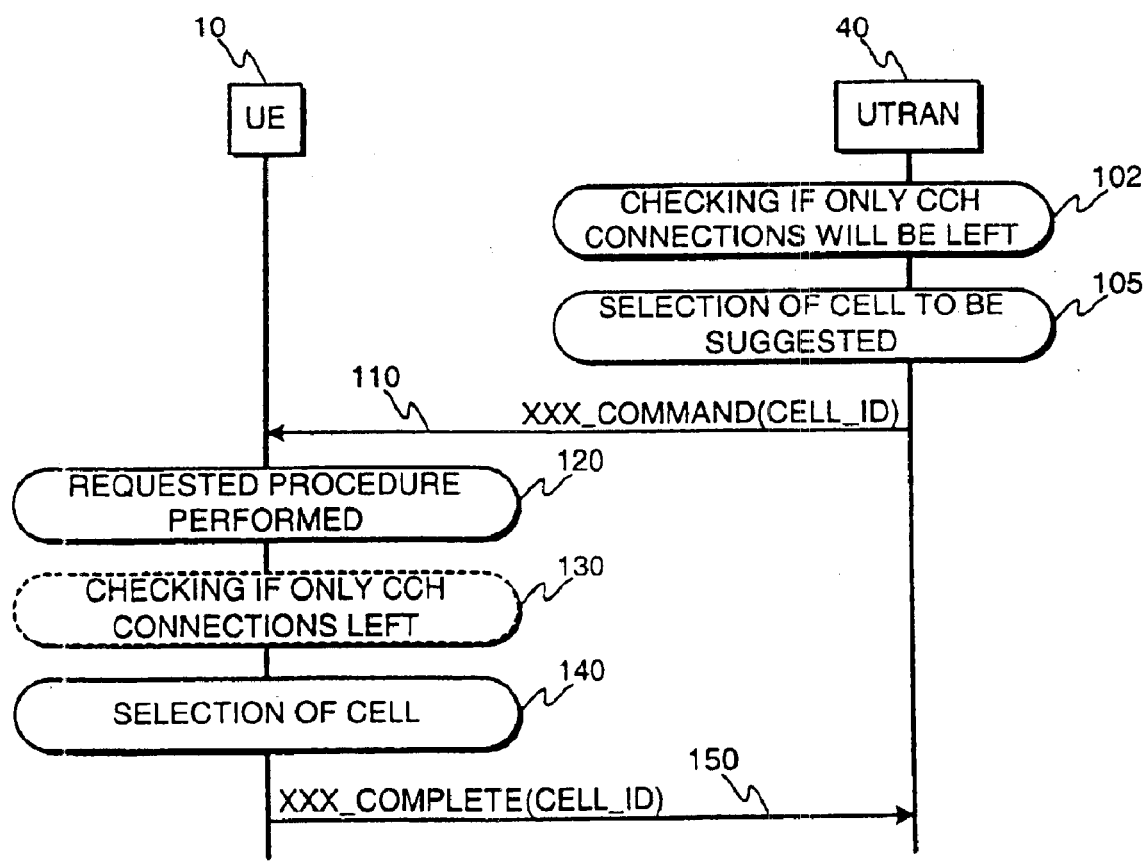
FIG. 4 illustrates signalling according to an advantageous embodiment of the invention.

FIG. 4 illustrates signalling according to an advantageous embodiment of the invention. In this embodiment, the network suggests to the UE the cell used in the CCH state. Before initiating the necessary RRC procedure, the network checks 102 if only CCH connections will be left after the procedure. If that is the case, as it is in this example, the network selects 104 the cell to be suggested to the UE as the location of the UE in the CCH state. Next, the network initiates the desired RRC procedure by sending 110 a XXX_COMMAND to the UE, attaching identification information of the suggested cell CELL_ID as a parameter to the XXX_COMMAND message. After receiving the XXX_COMMAND message, the UE performs 120 the requested RRC procedure.

In this embodiment, the UE may perform checking 130, if only CCH connections still exist after the RRC procedure. However, the inclusion of a CELL_ID parameter to the XXX_COMMAND may in various embodiments of the invention be taken as an indication, that only CCH connections are left, in which case a cell needs to be selected.

Next, the UE selects the cell to be used as the location of the UE in the CCH state. The UE may take into account the suggestion of the network, if it so chooses. However, the UE may have preferences, for example set by the user of the UE, about which cells are to be preferred. Based on for example such information, the UE may select another cell than the one suggested by the network. Thus the UE can select the cell from a set of cells comprising the cell indicated by the network and any other cells otherwise known by the UE, for example such as those belonging to the active set or those cells whose identification signals the UE can currently receive. After this, the UE sends 150 a XXX_COMPLETE message back to the network. The UE sends identification information CELL_ID of the selected cell to the network as a parameter of the XXX_COMPLETE message.

In the previous examples, the network element originating the XXX_COMMAND messages and receiving the XXX_

COMPLETE messages, i.e. the network element comprising the RRC protocol entities in the UTRAN, is typically a radio network controller (RNC).

In a further advantageous embodiment of the invention, a cell of the active set i.e. of those cells in use by the UE is appointed as a default cell. In such an embodiment, the cell does not need to be identified in the XXX_COMMAND and XXX_COMPLETE message, since a default cell is already known. The communication of the default cell is in such a case effected with messaging associated with updating of the active set. This feature can in various embodiments of the invention be used in combination with the previously described features. For example, in one embodiment of the invention the network always suggest the default cell to the UE, but the UE makes the final decision by itself.

The invention reduces the amount of signalling between the UE and the network, since the selection of cell does not incur more messaging, as the known solutions do. Further, the invention reduces amount of processing in the UE and in the network, since amount of messaging is decreased. This is very important regarding the UE, since any messaging over the radio interface consumes energy, which is a critical resource in typical battery-operated mobile handsets. The invention also reduces delay in changing from DCH to CCH state, since the time spent in messaging is reduced along with the messaging.

The invention can be advantageously applied in third generation cellular systems, such as the UMTS (Universal Mobile Telecommunication System) or the IMT2000 cellular system.

In the previous embodiments, in which the network suggests or selects a cell to be used in the CCH state, the network may base the selection of the cell for example on information specific to the network, such as to select a cell under control of the serving RNC. The network may for example also select a macro cell i.e. a cell with a relatively large area to avoid the situation, in which the UE selects a microcell i.e. a cell with a very small area, in which case the network would most probably have to perform a handover for the connection or the connections of the UE very soon.

If the cell selected to be used in the CCH state is already in the active set i.e. the set of cells used by the UE when the cell selection is performed, the selected cell can in various embodiments of the invention be indicated by radio link identification information LINK_ID instead of cell identification information CELL_ID. In such a case, the network can indicate a cell to the UE by attaching the radio link identification information LINK_ID to the XXX_COMMAND message. Similarly, the UE can indicate a cell to the network by attaching the radio link identification information LINK_ID to the XXX_COMPLETE message.

The present invention has several advantages. For example, according to the inventive method, the UE does not need to perform signalling when entering a new cell as a result of a DCH to CCH state change. Since according to the invention, the cell to be selected is identified before the state change, no signalling is needed in the new cell for identification of the selected cell. This advantage is obtained both in embodiments, in which the UE performs the final selection, and in embodiments in which the network performs the final selection. Therefore, the amount of signalling is lower than in the solutions according to the prior art.

The name of a given functional entity, such as the radio network controller, is often different in the context of different cellular telecommunication systems. For example, in the GSM system the functional entity corresponding to a radio network controller (RNC) is the base station controller (BSC). Therefore, the term radio network controller is intended to cover all corresponding functional entities regardless of the term used for the entity in the particular cellular telecommunication system. Further, the various command names such as the XXX_COMMAND command name are intended to be examples only, and the invention is not limited to using the command names recited in this specification.

The term mobile station is used in the claims to denote a UE or a corresponding mobile communication means.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

What is claimed is:

1. A method for use in a cellular telecommunications network for selection of a cell for use by a mobile station in a cell-command state, said cellular telecommunications network comprising a plurality of radio access networks having cells, said cells being grouped into registrations areas, and said mobile station having a plurality of states, said states comprising an idle-mode state; a registration-area-connected state, in which state the location of a mobile station is known to the cellular telecommunications network on a registration area level; and a cell-connected state, in which state the location of a mobile station is known to the cellular telecommunications network on a cell level, the method comprising the steps of:

selecting, by the network, a cell to be suggested as the cell for use by the mobile station in the cell-connected state, and indicating, by the network, said selected cell to be suggested by attaching cell identification information as a parameter to a message initiating a change of the mobile station to the cell-connected state.

2. The method of claim 1, wherein said message is a Radio Resource Control (RRC) message.

3. The method of claim 1, further comprising the steps of:

selecting, by the mobile station, a cell for use in the cell-connected state, and indicating, by the mobile station, the selected cell by attaching cell identification information as a parameter to a second message.

4. The method of claim 3, wherein the step in which the mobile station selects a cell comprises the step of:

selecting from a set of cells comprising cells known by the mobile station and said cell suggested by the network.

5. The method of claim 1, further comprising the step of:

selecting, by the network, a cell of the active set of the mobile station to be a default cell to be suggested to the mobile station.

6. A method for reducing the signaling between a radio access network and a mobile station when the mobile station transitions from a dedicated channel state, in which the mobile station has one dedicated radio link for each cell in the set of cells used by the mobile station, to a common channel state, in which the mobile station shares a common channel with other users, comprising the step of:

suggesting by the radio access network, a cell to be used by the mobile station in the common channel state, said suggesting step comprising the sub-steps of:

selecting the cell to suggest attaching information identifying the selected cell to suggest as a parameter to a control message from the radio access network to the mobile station, wherein said control message initiates a procedure in the mobile station, and said procedure may result in a transition from the dedicated channel state to the common channel state, and transmitting said control message with the attached information identifying the suggested cell to the mobile station.

7. The method of claim 6, further comprising the steps of:
receiving, by the mobile station, the control message with the attached information identifying the suggested cell; and performing, by the mobile station, the procedure initiated by the received control message.

8. The method of claim 7, wherein the control message transmitted from the radio access network to the mobile station comprises a command to initiate the procedure (a procedure-command message).

9. The method of claim 7, further comprising the step of:
transmitting, by the mobile station, a control message to the radio access network indicating that the procedure has been completed, wherein said procedure-complete control message comprises information identifying the cell to be used by the mobile station in the common channel state.

10. The method of claim 9, wherein the cell to be used by the mobile station in the common channel state is the cell suggested by the radio access network.

11. The method of claim 9, further comprising the step of:
selecting, by the mobile station, the cell to be used by the mobile station in the common channel state, wherein it is the selected cell which is identified in the information transmitted in the procedure-complete control message.

12. The method of claim 7, further comprising the step of:
checking whether there are only common channel connections left between the mobile station and the radio access network after the procedure has been performed by the mobile station.

13. The method of claim 12, wherein, if only common channel connections are left after the procedure has been performed, the method further comprises the step of:
selecting, by the mobile station, the cell to be used by the mobile station in the common channel state, which the mobile station will enter because there will only be common channel connections left after the procedure is performed.

14. The method of claim 13, wherein the step of selecting the cell to be used by the mobile station in the common channel state comprises the step of:
selecting from a set of cells comprising at least the cell suggested by the radio access network.

15. The method of claim 14, wherein the set of cells further comprises any cells known to the mobile station.

16. The method of claim 14, wherein, if only common channel connections are left after the procedure has been performed, the method further comprises the step of:
transmitting, by the mobile station, a control message to the radio access network indicating that the procedure has been completed, wherein said procedure-complete control message comprises information identifying the cell, selected by the mobile station, to be used in the common channel state.

17. The method of claim 12, wherein, if only common channel connections are left after the procedure has been performed, the method further comprises the step of:
transmitting, by the mobile station, a control message to the radio access network indicating that the procedure has been completed, wherein said procedure-complete control message comprises information identifying the cell to be used by the mobile station in the common channel state.

18. The method of claim 12, wherein the radio access network performs the checking step.

19. The method of claim 18, wherein, if the radio access network determines that not only common channel connections are left after the procedure has been performed, the radio access network does not perform the suggesting step.

20. A method for reducing the signaling between a radio access network and a mobile station when the mobile station transitions from a dedicated channel state, in which the mobile station has one dedicated radio link for each cell in the set of cells used by the mobile station, to a common channel state, in which the mobile station shares a common channel with other users, comprising the steps of:
when a control message commanding a mobile station to perform a control procedure is to be sent to the mobile station from a radio access network, performing the step of:
checking, by the radio access network, whether there will be only common channel connections left between the mobile station and the radio access network after the procedure commanded by the control message has been completed;

if the radio access network determines that there will be only common channel connections left between the mobile station and the radio access network after the procedure commanded by the control message has been completed, performing the steps of:
selecting, by the radio access network, a cell to be used by the mobile station in the common channel state, into which state the mobile station will transition after the procedure is performed because there will only be common channel connections left,
attaching information identifying the selected cell as a parameter to the control message commanding the mobile station to perform a control procedure, and
transmitting said control message with the attached information identifying the selected cell to the mobile station; and if the radio access network determines that there will be at least one dedicated channel connection left between the mobile station and the radio access network after the procedure commanded by the control message has been completed, performing the step of:
transmitting said control message.

21. A method for use in a cellular telecommunications network for selection of a cell for use by a mobile station in a cell-connected state, said cellular telecommunications network comprising a plurality of radio access networks having cells, said cells being grouped into registrations areas, and said mobile station having a plurality of states, said states comprising an idle-mode state; a registration-area-connected state, in which state the location of a mobile station is known to the cellular telecommunications network on a registration area level; and a cell-connected state, in which state the location of a mobile station is known to the cellular telecommunications network on a cell level, the method comprising the steps of:
selecting, by the network, a cell from the active set of the mobile station to be suggested as a default cell for use by the mobile station in the cell-connected state, and
indicating, by the network, said selected cell to be suggested as the default cell by attaching cell identification information as a parameter to a message initiating a change of the mobile station to the cell-connected state.

* * * * *